(12) United States Patent
Luther et al.

(10) Patent No.: US 8,152,386 B2
(45) Date of Patent: *Apr. 10, 2012

(54) FIBER OPTIC ADAPTER AND CONNECTOR ASSEMBLIES

(75) Inventors: James Phillip Luther, Hickory, NC (US); Martin Eugene Norris, Lenoir, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/849,525

(22) Filed: Aug. 3, 2010

(65) Prior Publication Data

US 2010/0316333 A1 Dec. 16, 2010

Related U.S. Application Data

(62) Division of application No. 11/716,936, filed on Mar. 12, 2007, now Pat. No. 7,785,016.

(51) Int. Cl.
*G02B 6/38* (2006.01)

(52) U.S. Cl. ......... 385/71; 385/55; 385/59; 385/60; 385/72; 385/75; 385/78; 385/89

(58) Field of Classification Search ......... 385/59, 385/71
See application file for complete search history.

(56) References Cited

U.S. PATENT DOCUMENTS

| | | | | |
|---|---|---|---|---|
| 5,179,607 A | * | 1/1993 | Sellers et al. | 385/70 |
| 5,214,730 A | * | 5/1993 | Nagasawa et al. | 385/59 |
| 5,259,052 A | | 11/1993 | Briggs et al. | 385/78 |
| 5,751,874 A | | 5/1998 | Chudoba et al. | 385/72 |
| 5,778,122 A | | 7/1998 | Giebel et al. | 385/55 |
| 5,867,621 A | | 2/1999 | Luther et al. | 385/59 |
| 5,887,095 A | | 3/1999 | Nagase et al. | 385/58 |
| 5,909,526 A | | 6/1999 | Roth et al. | 385/78 |
| 5,920,669 A | | 7/1999 | Knecht et al. | 385/76 |
| 5,993,071 A | | 11/1999 | Hultermans | 385/70 |
| 6,002,331 A | | 12/1999 | Laor | 340/539 |
| 6,579,014 B2 | | 6/2003 | Melton et al. | 385/76 |
| 6,698,938 B2 | | 3/2004 | Ziegler et al. | 385/77 |
| 6,715,930 B2 | | 4/2004 | McBride | 385/73 |
| 6,869,227 B2 | * | 3/2005 | Del Grosso et al. | 385/71 |

(Continued)

FOREIGN PATENT DOCUMENTS

EP 0936484 A1 8/1999

(Continued)

OTHER PUBLICATIONS

Patrick McLaughlin, "Fiber-optic adapters: More than just a good mate," Cabling Installation & Maintenance, Mar. 1, 2006, XP002483545.

(Continued)

*Primary Examiner* — Charlie Peng

(57) ABSTRACT

A fiber optic assembly comprising an adapter assembly defining an internal cavity, a first end for a receiving a first fiber optic connector, and a second end for receiving a second fiber optic connector, wherein the first and the second fiber optic connectors are dissimilar. A fiber optic connection comprising a first fiber optic connector comprising a connector housing, a first multi-fiber ferrule, and a clearance about an end face of the first multi-fiber ferrule for clearing a ferrule surround during connector mating, and a second connector that is a FOCIS 5 compliant MTP connector.

22 Claims, 5 Drawing Sheets

U.S. PATENT DOCUMENTS

| | | | |
|---|---|---|---|
| 6,905,251 B2 | 6/2005 | Fujiwara et al. | 385/53 |
| 6,926,449 B1 | 8/2005 | Keenum et al. | 385/76 |
| 6,944,378 B1 | 9/2005 | Belew et al. | 385/52 |
| 7,048,447 B1 | 5/2006 | Patel et al. | 385/50 |
| 7,207,727 B2 | 4/2007 | Tran et al. | 385/76 |
| 7,296,935 B1 | 11/2007 | Childers et al. | 385/55 |
| 7,785,016 B2 * | 8/2010 | Luther et al. | 385/71 |
| 2006/0193562 A1 | 8/2006 | Theuerkorn | 385/53 |
| 2006/0204178 A1 | 9/2006 | Theuerkorn et al. | 385/59 |
| 2008/0112672 A1 | 5/2008 | Lewallen et al. | 385/58 |

FOREIGN PATENT DOCUMENTS

| | | |
|---|---|---|
| WO | WO2008/060550 A1 | 5/2008 |

OTHER PUBLICATIONS

Patent Cooperation Treaty, International Search Report for International Application No. PCT/US2008/003136, Jun. 26, 2008, 2 pages.

* cited by examiner

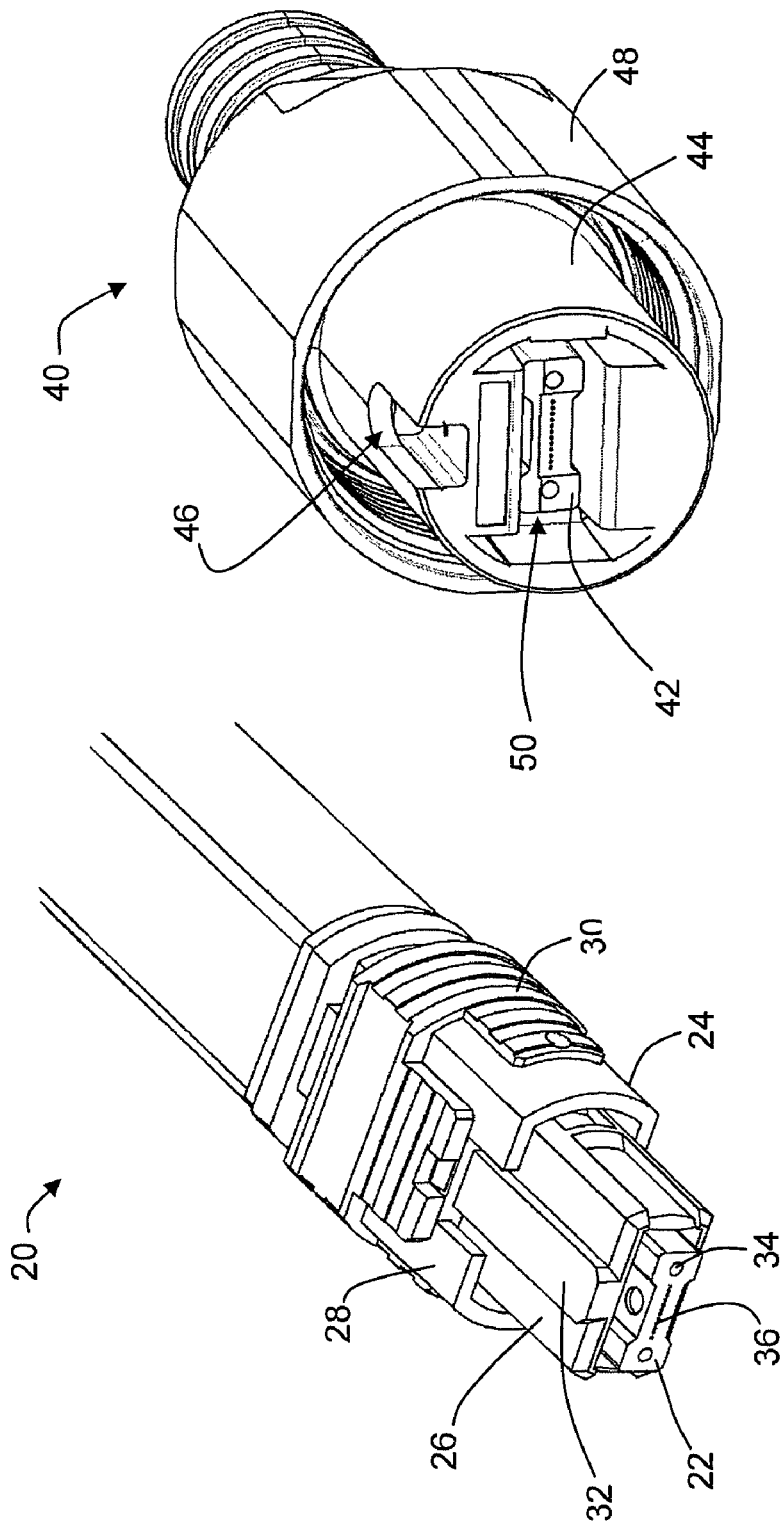

FIBER OPTIC ADAPTER AND CONNECTOR ASSEMBLIES

CROSS-REFERENCED TO RELATED APPLICATIONS

This application is a Divisional of U.S. Ser. No. 11/716,936 filed on Mar. 12, 2007 now U.S. Pat. No. 7,785,016, the entire disclosure of which is hereby incorporated by reference.

BACKGROUND OF THE INVENTION

1. Field of the Invention

The present invention relates generally to a fiber optic adapter and mating dissimilar multi-fiber connectors, and more particularly, to a fiber optic adapter that allows a TIA FOCIS 5 compliant MTP connector to mate with a dissimilar connector having a pocket at least large enough to accept the FOCIS 5 compliant MTP connector.

2. Technical Background

It is often necessary within fiber optic networks to optically connect optical fibers through mating connectors. Mating connectors may include connector alignment features on the ferrules themselves for fine alignment, but are typically grossly aligned using some form of adapter assembly. Adapters may be stand-alone components or may be maintained within network structures, walls or receptacles, such as within a network connection terminal. While certain like connectors may be mated using known adapter designs, mating dissimilar connectors requires a new, more complex adapter design. Desirable adapters should not only properly align mating connectors, but should also protect the mating connectors and optical fibers from adverse environmental and mechanical influences, such as from side loading, rotational and tensile forces.

Referring to FIG. 1, an example of a conventional multi-fiber optical connector known as a TIA FOCIS 5 compliant MTP® connector (hereinafter referred to as the "MTP connector 20") is shown. The MTP connector 20 has a generally rectangular cross-section and includes a multi-fiber ferrule 22 maintained within a connector housing 24. The connector housing 24 includes a ferrule surround portion 26 positioned about ferrule 22 and a rear housing portion 28 engaged with the ferrule surround portion 26 and defining a gripping surface 30. The MTP connector 20 further includes a protruding exclusion feature 32 (the exclusion feature 32 may also be referred to as a "key" in some applications) that allows connector insertion into only an appropriate receiver, adapter or connector. The ferrule surround portion 26 protrudes about as far as the end face of the ferrule 22. The ferrule 22 defines guide pin bores 34 and fiber bores 36 for receiving guide pins and optical fibers therein, respectively. The MTP connector 20 may further include a biasing spring and additional components.

Referring to FIG. 2, an example of a conventional multi-fiber optical connector 40 known under the marks "OptiTip™" and "Con2r™" available from Corning Cable Systems of Hickory, N.C. is shown. The connector 40 includes a multi-fiber ferrule 42 maintained within a plug housing 44 defining a key slot 46 for ensuring proper mating and mating orientation. A threaded coupling nut 48 is positioned about the plug housing 44 and threadably engages an adapter or other structure to which the plug 40 is engaged. The plug housing 44 defines an internal cavity 50 having a predetermined geometry that may be defined by the plug housing 44 or by an insert received within the plug housing 44.

Referring to FIG. 3, an attempted mating or connection of the MTP connector 20 shown in FIG. 1 and the connector 40 shown in FIG. 2 is illustrated. As shown at reference numbers 60 and 62, when the MTP connector 20 is attempted to be engaged with connector 40, the ferrule surround portion 26 of the MTP connector 20 interferes with the internal geometry of the connector 40. Specifically, ferrule holder portions 64 and 66 interfere with connector geometry 68 and 70, respectively, to prevent proper engagement and ferrule-to-ferrule mating. Thus, the internal geometry of the conventional connector 40 prevents proper mating because a clearance is not provided for the surround structure of the MTP connector.

In order to solve the connector interference problem that occurs when mating a TIA FOCIS 5 MTP connector and an OptiTip connector, what is needed is a change in either connector structure that will permit engagement. Thus, it would be desirable to provide a connector having structure that allows the connector to mate with a connector having dissimilar structure. Further, it would be desirable to provide an adapter that allows for the mating of dissimilar connectors, for example, an adapter for mating a TIA FOCIS 5 compliant MTP connector with an OptiTip connector available from Corning Cable Systems of Hickory, N.C. A desirable adapter would provide proper connector maintenance and alignment while reducing or eliminating forces applied to connectors engaged with conventional adapters.

SUMMARY OF THE INVENTION

To achieve the foregoing and other objects, and in accordance with the purposes of the invention as embodied and broadly described herein, the present invention provides various embodiments of connector and adapter designs that allow ferrules of dissimilar connectors to properly contact during the mating of the dissimilar connectors. The present invention further provides various embodiments of adapter assemblies designed to readily mate a TIA FOCIS 5 compliant MTP connector with a dissimilar connector having a structure as described herein, in a precise manner while providing resistance against mechanical forces including, but not limited to, side load, tensile and rotational forces.

In one embodiment, the present invention provides a multi-fiber fiber optic connector for presenting a plurality of optical fibers for optical connection. The connector provides a pocket, also referred to as herein as a "void," to allow a ferrule surround portion of a TIA FOCIS 5 compliant MTP connector clearance so that the optical fibers of the connector and the MTP connector come into proper optical contact during mating. The multi-fiber connector includes a connector housing defining an internal cavity and internal cavity that includes clearance for an MTP connector ferrule surround portion during connector engagement. The connector housing is generally cylindrical in cross-section and includes a threaded coupling nut for providing threadbable engagement with a receptacle, receiver or other connector housing. In one embodiment, the connector housing may define the internal clearance for the MTP connector. In an alternative embodiment, the internal clearance may be defined by a connector insert. The connector may further include key slots and/or keys for providing keyed engagement with a receptacle, receiver or connector for orientation, and in some embodiments, for exclusion. The connector further includes any known multi-fiber connector and may include a multi-fiber connector that is generally rectangular in cross-section and include guide pin bores and fiber bores. The connector is mounted upon the end of a fiber optic cable.

In another embodiment, the present invention provides an adapter assembly for receiving dissimilar multi-fiber connectors for optical connection. In one embodiment, the present invention provides an adapter assembly for receiving a TIA FOCIS 5 compliant MTP connector in one side and a dissimilar multi-fiber connector on the other side having a structure as described herein. The adapter includes a housing defining first and second ends and an internal cavity therethrough. The adapter may include external threading to for threadable engagement with the connectors. The adapter assembly may include structure for securing the assembly within a wall or port of a connection terminal or other structure within an optical network. The adapter assembly is a means for receiving and allowing optical connection between dissimilar multi-fiber connectors. The adapter assembly may optionally include alignment structure within for aligning the mating connectors. In additional embodiments, the adapter assembly may include structure for resisting connector side-loading and other mechanical forces.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

These and other features, aspects and advantages of the present invention are better understood when the following detailed description of the invention is read with reference to the accompanying drawings, in which:

FIG. 1 is a perspective view of a TIA FOCIS 5 compliant MTP connector as is known in the art.

FIG. 2 is a perspective view of a prior art multi-fiber connector that does not include clearance for an MTP connector ferrule holder surround.

DETAILED DESCRIPTION OF THE PREFERRED EMBODIMENTS

Figure 3:
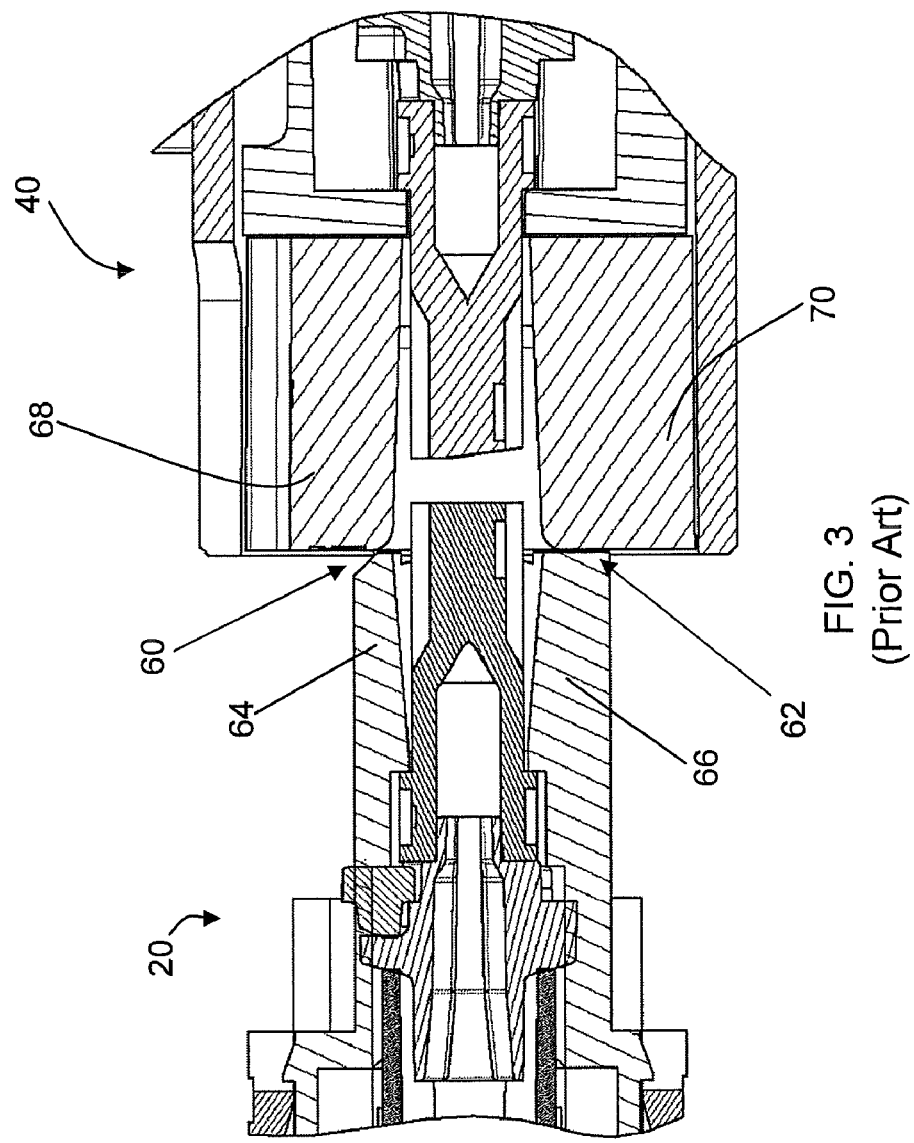
FIG. 3 is a side cross-sectional view of the MTP connector of FIG. 1 and the connector of FIG. 2 shown in attempted engagement with structural interference.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

An adapter assembly as described herein refers to structure for optically connecting optical fibers within a communications network. An adapter of the present invention may be designed such that it may be utilized for indoor or outdoor connections, mounted within a wall of an enclosure, closure, housing or other structure defining a wall or port through which one or more optical fibers are typically interconnected. An adapter assembly of the present invention may also be mounted within a network connection terminal, pedestal, network interface device or like structure. An adapter assembly of the present invention may also be a stand-alone component, such as an in-line adapter.

An adapter assembly of the present invention typically receives connectors, also referred to herein as "plug assemblies." A connector includes the structure mounted upon the end of a fiber optic cable including at least one optical fiber. Fiber optic cables of the present invention may be referred to as "drop cables" and the term is used to generically describe all types of fiber optic cables such as, but not limited to, distribution cables, drop cables, dielectric cables, tether cables and armored drop cables. It is envisioned that the drop cable may include any number of optical fibers. Particular components of the adapter assemblies and connectors described herein may be modified to accommodate different drop cable types. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostrucutred optical fibers or any other expedient for transmitting light signals.

As used herein, the term "MTP connector" refers to a multi-fiber connector that contains up to twelve optical fibers within a single ferrule. The design allows the use of ribbonized fiber to achieve very high density. TIA/EIA-604-5, Fiber Optic Intermateability Standard, Type MPO (FOCIS 5) describes the dimensions and tolerances required for intermateability between manufacturers' products. Connectors and adapters from different manufacturers that are compliant to this document are capable of intermating. "MPO" is a generic name for the MTP connector, and MPO and MTP connectors that are compliant to FOCIS 5 can intermate. Other twelve-fiber connector types that are not compliant to FOCIS 5 are not intermateable with MTP/MPO connectors or adapters. IEC 1754-7/A2, Fiber Optic Connector Interfaces Part 7: Type MPO Connector Family provides similar information for the international market. The MTP connector as described herein typically includes four, eight or twelve fiber varieties, among others. MTP end faces are aligned using precise guide pins. One connector has guide pins and the other has corresponding guide pin holes.

Figure 4:
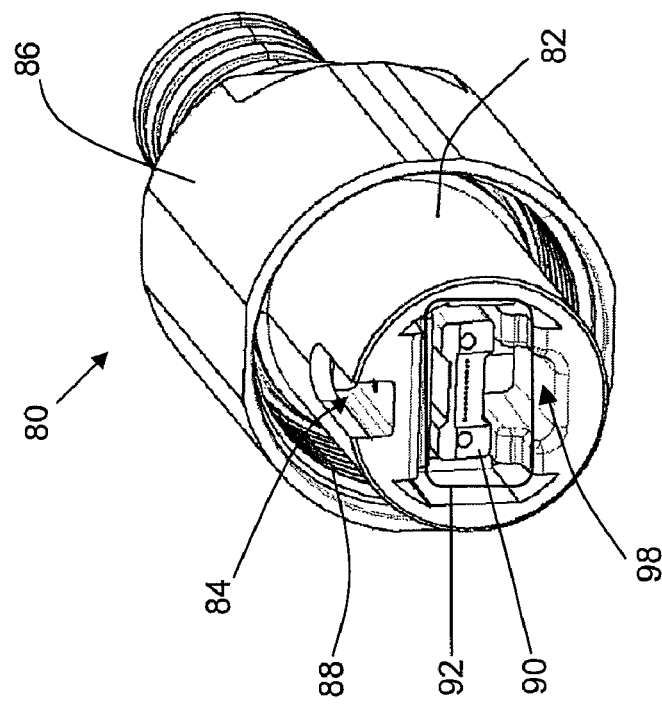
FIG. 4 is a perspective view of a multi-fiber connector including a pocket for clearance of an MTP connector ferrule surround.

Referring to FIG. 4, a multi-fiber connector 80 in accordance with one embodiment of the present invention is shown. The connector 80 includes a housing 82 having a generally cylindrical cross-section that defines an internal cavity and a predetermined internal geometry. The housing 82 further defines a key slot 84 positioned about one end of the housing for receiving a key of a receptacle, receiver, adapter or other structure to which the connector is engaged. The key provides for proper orientation and may also act as an exclusion feature. The housing 82 is attached to a coupling nut 86 that is used to secure the connector 80 to the receptacle, receiver, adapter or another connector. As shown, the coupling nut 86 is internally threaded and threadably engages an external threading. The connector 80 further includes a multi-fiber ferrule 90 maintained within. The multi-fiber ferrule may be any known multi-fiber ferrule and as shown, has a generally rectangular cross-section and a guide pin and fiber bores. Although not shown, the connector 80 may further include a ferrule holder and a biasing member, as well as other components.

Figure 5:
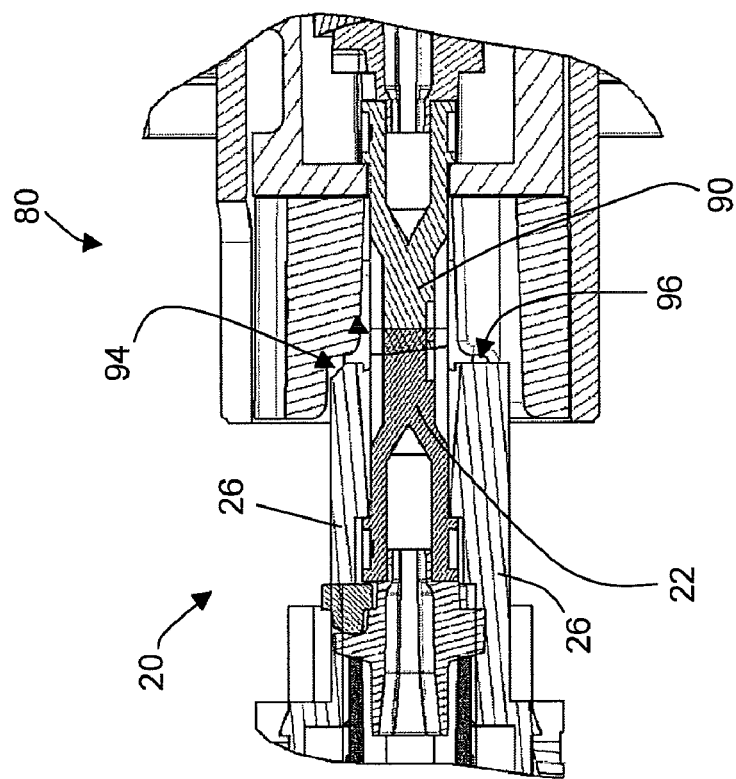
FIG. 5 is a side cross-sectional view of the MTP connector of FIG. 1 and the connector of FIG. 4 shown engaged and without structural interference.

The connector 80 internal geometry defines a pocket 92, also referred to herein as a "clearance" or a "void," about the ferrule 90. The pocket 92 is at least large enough to accept a FOCIS 5 compliant MTP connector. Conventional connectors having some similarity in design to the one shown in FIG. 4 do not include the pocket 92. The pocket 92 is necessary for allowing the ferrule of the connector 80 and the ferrule of a TIA FOCIS 5 compliant MTP connector to come into contact during mating. Referring to prior art FIG. 1, the MTP connector 20 includes a ferrule surround portion 26 that extends about as far forward as the end face of the ferrule 22, and thus interferes with the internal geometry of the conventional connector 40 as shown in FIGS. 2 and 3. Referring to FIG. 5, the pocket 92 provides clearance (shown at reference numbers 94 and 96) for allowing the ferrule surround portion 26 to clear during engagement, thus permitting proper ferrule-to-ferrule contact. Referring again to FIG. 4, the pocket 92 may be at least as large as necessary to allow for the MTP surround 26 to clear, and may be larger. In one embodiment, the pocket 92 may include a substantially empty internal cavity other than the ferrule 90. In an alternative embodiment, the pocket 92 may also include a clearance or a key slot 98 for allowing an exclusion feature, key or other protruding feature of the MTP connector 20 to pass therethrough. The pocket 92 may be defined by an internal cavity insert or may be integrally formed by the connector housing 82 or other connector component.

Figure 7:
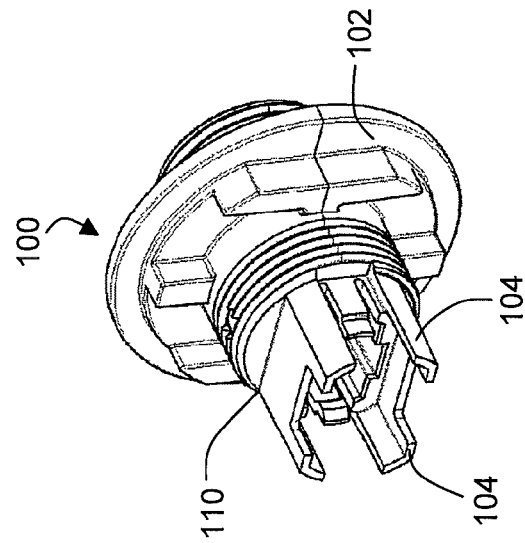
FIG. 7 is a perspective view of an adapter assembly having structure for reducing side-loading and other mechanical forces placed upon a connector.
Figure 6:
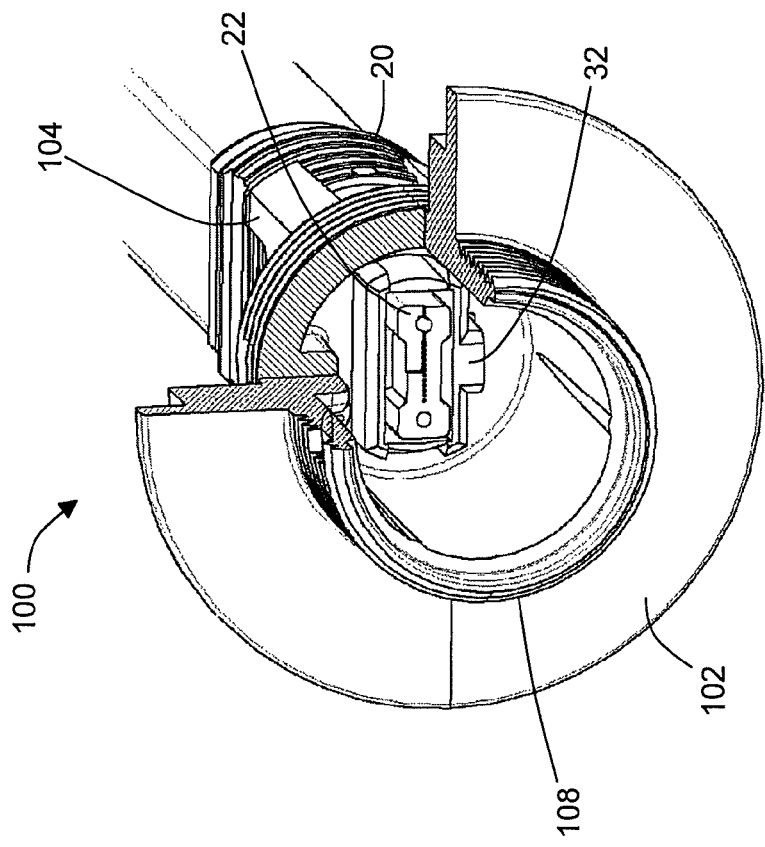
FIG. 6 is a cut-away perspective view of an adapter assembly with a loaded MTP connector.
Figure 8:
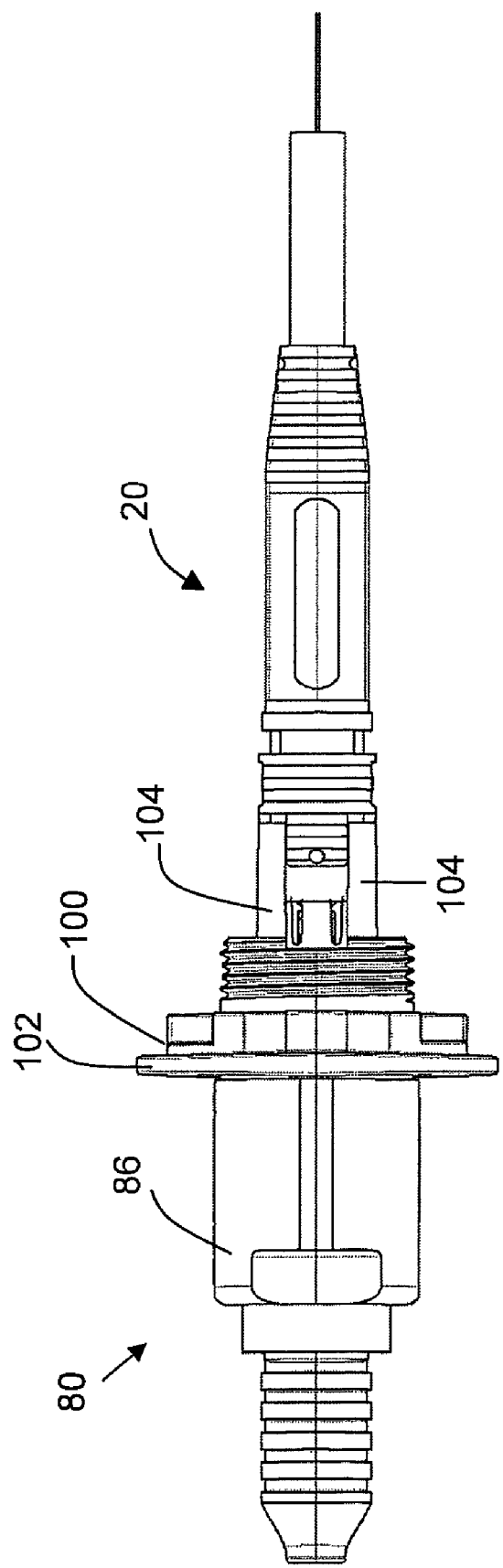
FIG. 8 is a top view of the MTP connector and connector of FIG. 4 shown loaded into the adapter assembly of FIG. 7.

Referring to FIGS. 6, 7 and 8, an adapter assembly 100 is shown. Referring specifically to FIG. 6, the adapter assembly 100 is shown with a TIA FOCIS 5 compliant MTP connector 20 loaded therein. Referring specifically to FIG. 7, the adapter assembly 100 is shown unpopulated. Referring to FIG. 8, the adapter assembly 100 is shown with both an MTP connector and a connector as described above and shown in FIG. 4 loaded into the adapter. The adapter assembly 100 includes a flange 102 that may provide support against a wall in which the adapter assembly is installed. In one embodiment, the flange 102 may be installed against the internal side of a wall to resist pulling forces on the adapter. The adapter assembly 100 is used to align two dissimilar connectors for mating. A first end 108 of the adapter shown as the forwardmost portion in FIG. 6 receives the connector 80 as shown in FIG. 4 and described above. The second end 110 of the adapter assembly 100 shown as the forwardmost portion in FIG. 7 receives the MTP connector shown loaded into the adapter in FIG. 6. The first side of the adapter assembly 100 defines external threading for threadable engagement with the coupling nut 86 of the connector. The second side of the adapter assembly 100 defines structure for eliminating or decreasing mechanical forces placed upon the connector, such as forces created during connector loading and unloading. The adapter assembly 100 may be integrally formed or may include one or more joined together components. The adapter assembly 100 and connectors described herein may be made from thermoplastic materials, such as nylon or ULTEM™ material provided by General Electric Company, or may be made from metal, ceramic, other material or combinations of materials.

The adapter assembly 100 functions to reduce or eliminate forces placed upon the ferrule during loading and removal. Shroud portions 104 of the adapter assembly are lengthened to accept and partially surround a portion of the MTP connector housing 24 that is handled during loading and unloading. Clearances between the connector housing 24 and the adapter assembly 100 are tightened up to substantially eliminate play between components and prevent forces from reaching the ferrule. Thus, excess "wiggle" is reduced or eliminated. This adapter assembly 100 may define variations of wrap-around arms that engage with the sides of the connector 20. Shroud protrusions may also include a full cup-shaped protrusion, a partial-surround, castling, or any other structure that provides lengthened engagement to the MTP connector housing. This insures that the MTP connector is aligned accurately along the long fiber axis and also serves to bolster the rigidity of the package in the short axis as well during disengagement.

Permissible variations intended to be covered within the scope of the present invention include alternative adapter assembly designs that add rigidity and alignment length to connector engagement. These features reduce the tendency of current MTP packages to suffer from ferrule chipping in plugs disengaged with side load present. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An adapter for mating dissimilar multi-fiber connectors, comprising:
    an adapter housing defining an internal cavity therethrough;
    a first end of the adapter housing for receiving a fiber optic connector, wherein the fiber optic connector comprises a connector housing, a first multi-fiber ferrule, and a clearance about an end face of the first multi-fiber ferrule for clearing a ferrule surround during connector mating; and
    a second end of the adapter housing for receiving a FOCIS 5 compliant MTP connector, wherein the FOCIS 5 compliant MTP connector comprises a second multi-fiber ferrule and the ferrule surround.

2. The adapter of claim 1, further comprising a flange positioned about midway between the first end and the second end.

3. The adapter of claim 1, wherein the fiber optic connector further defines a slot for providing clearance for an exclusion feature of the FOCIS 5 compliant MTP connector.

4. The adapter of claim 1, wherein the fiber optic connector defines a slot for receiving a key.

5. The adapter of claim 1, wherein the adapter housing further defines threading for threadably engaging with a coupling nut of the fiber optic connector.

6. The adapter of claim 1, further comprising a side-loading force reducing structure.

7. The adapter of claim 6, wherein the side-loading force reducing structure comprises a shroud that surrounds at least a portion of the FOCIS 5 compliant MTP connector.

8. The adapter of claim 2, wherein the flange extends from a surface of the adapter housing such that the flange fully encircles the adapter housing.

9. The adapter of claim 1, wherein the connector housing of the fiber optic connector is cylindrical.

10. An adapter for mating dissimilar multi-fiber connectors, comprising:
- an adapter housing defining an internal cavity therethrough;
- a first end of the adapter housing for receiving a fiber optic connector, wherein the fiber optic connector comprises a cylindrical connector housing, a first multi-fiber ferrule, and a clearance about an end face of the first multi-fiber ferrule for clearing a ferrule surround during connector mating;
- a second end of the adapter housing for receiving a FOCIS 5 compliant MTP connector, wherein the FOCIS 5 compliant MTP connector comprises a second multi-fiber ferrule and the ferrule surround;
- a flange positioned about midway between the first end and the second end, the flange radially extending from a surface of the adapter housing such that the flange fully encircles the adapter housing; and
- a shroud that surrounds at least a portion of the FOCIS 5 compliant MTP connector.

11. The adapter of claim 10, wherein the fiber optic connector further defines a slot for providing clearance for an exclusion feature of the FOCIS 5 compliant MTP connector.

12. The adapter of claim 10, wherein the fiber optic connector defines a slot for receiving a key.

13. The adapter of claim 10, wherein the adapter housing further defines threading for threadably engaging with a coupling nut of the fiber optic connector.

14. The adapter of claim 10, wherein the adapter housing is cylindrical.

15. An adapter for mating dissimilar multi-fiber connectors, comprising:
- an adapter housing defining a cylindrical internal cavity therethrough;
- a first end of the adapter housing for receiving a fiber optic connector, wherein the fiber optic connector comprises a connector housing, a first multi-fiber ferrule, a slot for receiving a key, and a clearance about an end face of the first multi-fiber ferrule for clearing a ferrule surround during connector mating, wherein the first end of the adapter housing further defines threading for threadably engaging with a coupling nut of the fiber optic connector; and
- a second end of the adapter housing for receiving a FOCIS 5 compliant MTP connector, wherein the FOCIS 5 compliant MTP connector comprises a second multi-fiber ferrule and the ferrule surround, wherein second end of the adapter housing further defines threading for threadably engaging with a coupling nut of the FOCIS 5 compliant MTP connector, and the fiber optic connector and the FOCIS 5 compliant MTP connector are dissimilar; and
- a side-loading force reducing structure extending from the second end of the adapter housing.

16. The adapter of claim 15, further comprising a flange positioned about midway between the first end and the second end.

17. The adapter of claim 16, wherein the flange radially extends from a surface of the adapter housing such that the flange fully encircles the adapter housing.

18. The adapter of claim 15, wherein the side-loading force reducing structure comprises a shroud that surrounds at least a portion of the FOCIS 5 compliant MTP connector.

19. The adapter of claim 7, wherein the shroud comprises at least two protrusions that partially surround a portion of the FOCIS 5 compliant MTP connector.

20. The adapter of claim 7, wherein the shroud fully surrounds a portion of the FOCIS 5 compliant MTP connector.

21. The adapter of claim 10, wherein the shroud comprises at least two protrusions that partially surround a portion of the FOCIS 5 compliant MTP connector.

22. The adapter of claim 18, wherein the shroud comprises at least two protrusions that partially surround a portion of the FOCIS 5 compliant MTP connector.

* * * * *